May 7, 1968   N. J. NORMANDO   3,382,345
ASYMMETRIC ALTERNATING CURRENT WELDING
Filed Aug. 1, 1966   6 Sheets-Sheet 1

INVENTOR
NEIL J. NORMANDO
BY Francis B. Henry
ATTORNEY

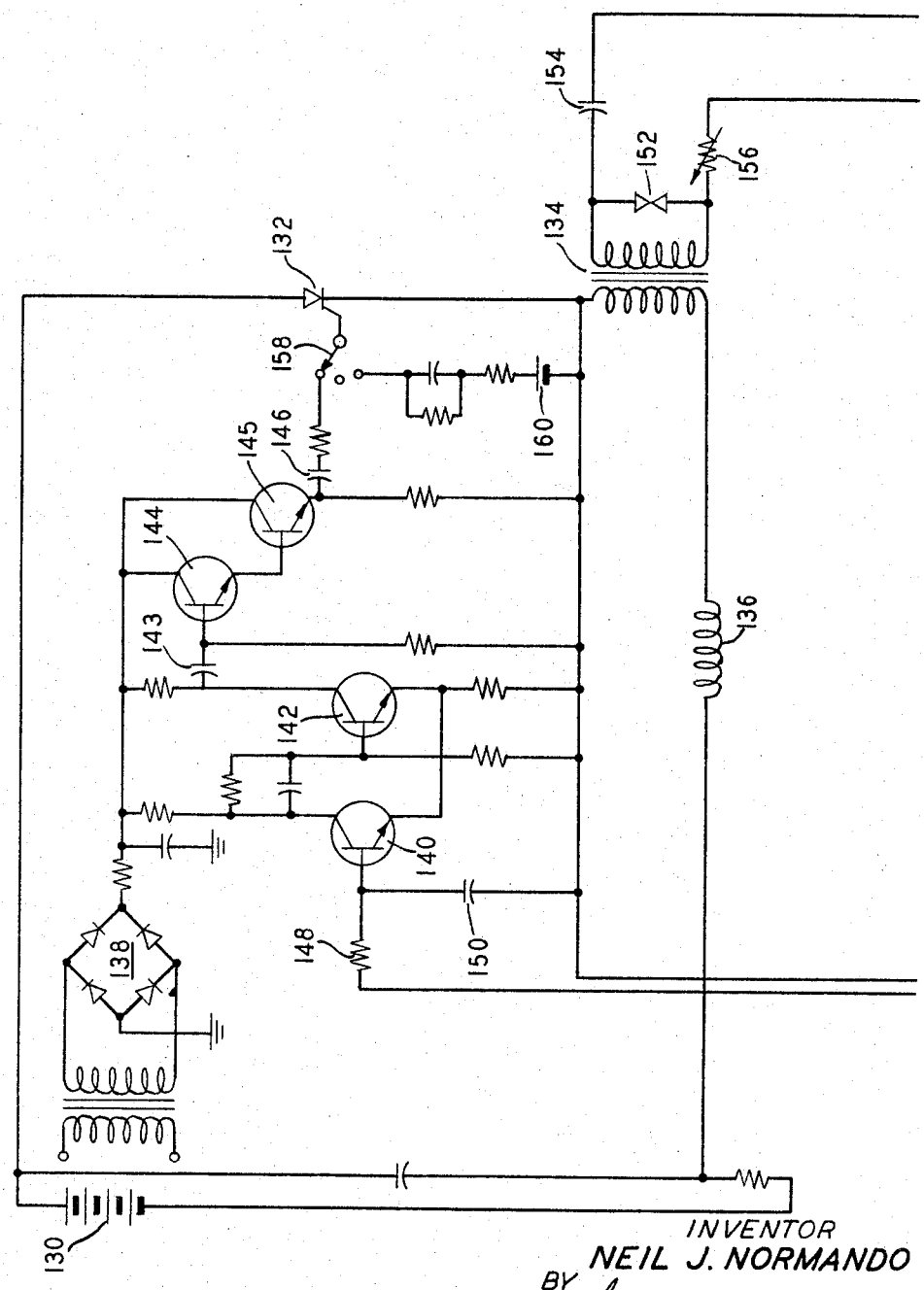

May 7, 1968 N. J. NORMANDO 3,382,345
ASYMMETRIC ALTERNATING CURRENT WELDING
Filed Aug. 1, 1966 6 Sheets-Sheet 5

INVENTOR
NEIL J. NORMANDO
BY
Francis B. Henry
ATTORNEY

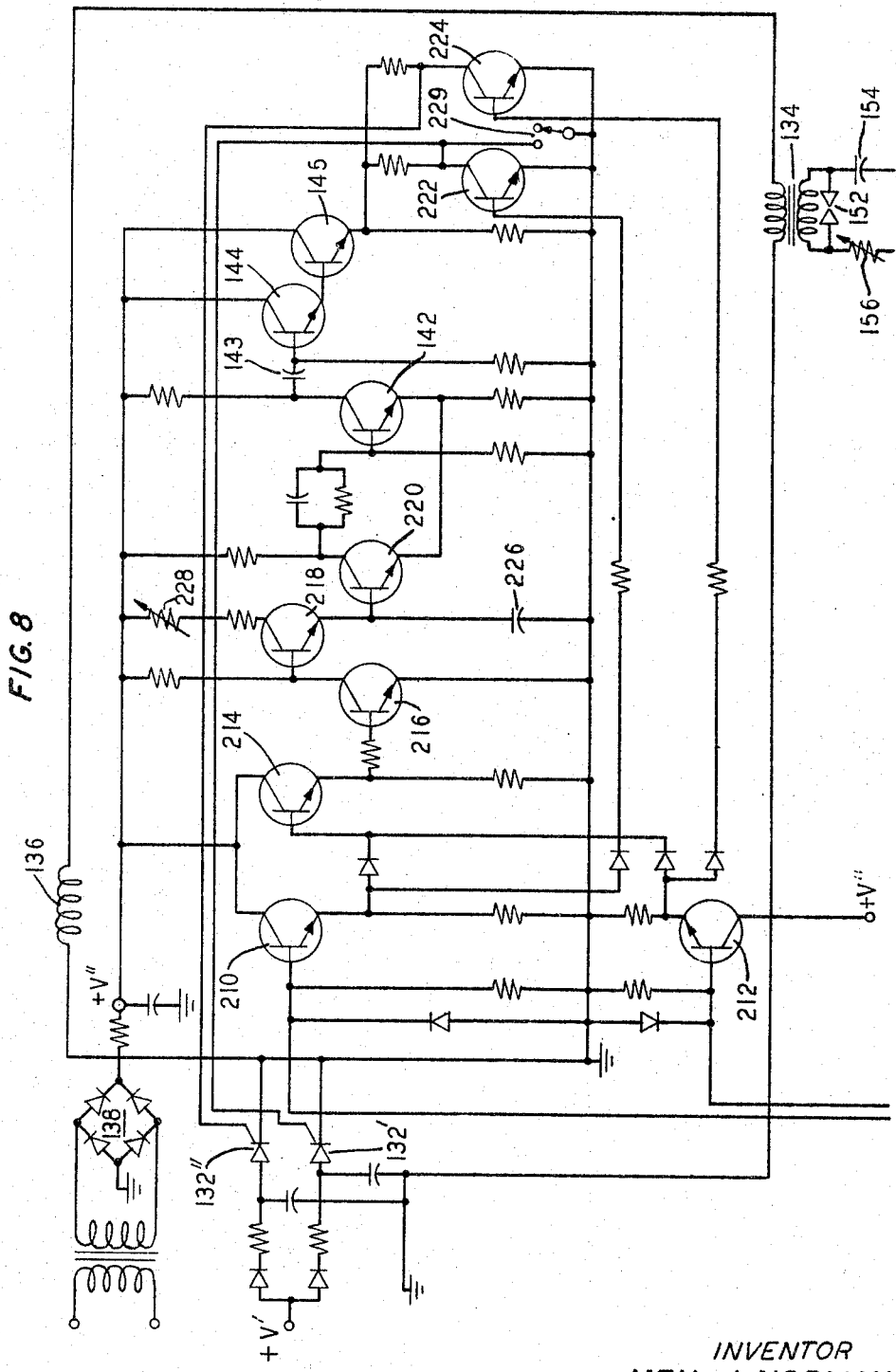

United States Patent Office 3,382,345
Patented May 7, 1968

3,382,345
ASYMMETRIC ALTERNATING
CURRENT WELDING
Neil J. Normando, Livingston, N.J., assignor to Air Reduction Company, Incorporated, New York, N.Y., a corporation of New York
Filed Aug. 1, 1966, Ser. No. 569,497
5 Claims. (Cl. 219—137)

ABSTRACT OF THE DISCLOSURE

A process, and apparatus for use therein, of electric arc welding with a continuous consumable electrode wherein a D.C. power supply is connected to supply welding current to the electrode through a switching means such that the polarity between the electrode and workpiece can be reversed at an adjustable frequency and the ratio of time at one polarity to the time at the opposite polarity may also be varied.

---

This invention relates to apparatus for and a method of alternating current welding, and to a method and means for regulating the proportions of the alternating current cycle occupied by positive and negative polarity respectively.

In terms commonly used in the art of direct current welding, the application of negative potential to the arc electrode and positive potential to the workpiece is called straight polarity welding, and the application of positive polarity to the arc electrode and negative to the workpiece is called reverse polarity welding. Each of these polarities is known to have its own peculiar advantages and disadvantages in various situations which arise in the electric welding art.

It has been proposed, for example, in U.S. Patent 2,697,160, issued Dec. 14, 1954, to C. S. Williams, to combine certain advantages of straight polarity with those of reverse polarity in non-consumable electrode gas shielded arc welding, by superposing reverse polarity peaks upon a straight polarity power supply, the reverse polarity peaks being of relatively short duration compared to the periods between peaks.

Progress in the electrical arts since the issuance of the said Williams patent, particularly the development of solid state switching devices, has made it possible to take a new and different approach to the problem of utilizing a combination of straight polarity and reverse polarity in welding, involving various objects, features and advantages.

A combination of reverse polarity and straight polarity states for the inert gas shielded tungsten electrode welding of aluminum and similar metals is also disclosed in U.S. Patent No. 3,068,352, issued Dec. 11, 1962 to T. B. Correy, in which again the periods of reverse polarity are relatively shorter than the periods of straight polarity.

In accordance with the present invention, in a method of arc welding using a consumable electrode, we utilize alternating periods of reverse polarity to accomplish the transfer of metal from the electrode to the workpiece by the inherent force of the arc, preferably in the known spray method of transfer as taught by Muller et al. U.S. Patent 2,504,868, issued Apr. 18, 1950, and we utilize alternating periods of straight polarity to enhance the heating of the electrode, preferably with no accompanying transfer of metal. We apply the reverse polarity to the arc over a longer proportion of the cycle of alternation than the straight polarity in order to obtain maximum metal transfer during the reverse polarity period and to substantially avoid metal deposition during the straight polarity period. The consumable electrode method disclosed and claimed herein is a modification of the pulsed power process disclosed and claimed in Anderson et al. U.S. Patent 3,071,680, issued Jan. 1, 1963. The optimum condition for maximum metal transfer may be arrived at by suitably adjusting both the frequency of alternation and the duty cycle, i.e., the relative times of dwell of the system in the reverse polarity state and in the straight polarity state.

The novel power supply system is also advantageously employed in non-consumable electrode welding of the type generally described in the aforesaid Williams and Correy patents as well as in other arc working applications.

An object of the invention is to control in a more precise manner than heretofore feasible the transfer of metal from a consumable electrode to a workpiece.

A related object is to control in a more precise manner the distribution of heat between the electrode and workpiece in an electric arc formed between an electrode and a workpiece.

Another object is to control the bead contour in such manner as to control the penetration.

Another object is to control accurately the ratio of alternate time intervals of straight polarity and reverse polarity in an asymmetrical alternating current supply.

A further object is to avoid deleterious effects of a direct current load component upon an alternating current source.

A feature of the invention is a high degree of flexibility, particularly in the selection and control of the length of time intervals devoted to straight polarity and reverse polarity respectively.

Another feature is independent control of frequency of reversal of polarity and of the division of time or duty cycle.

Another feature is that while the current flowing in the power source is unidirectional, the current delivered to the load alternates direction.

Another feature is the use of a synchronized voltage supply for arc re-ignition, more specifically a single-shot high frequency oscillator triggered by a timing circuit, which may be the same timing circuit used to control the proportioning of the intervals of straight and reverse polarities.

In accordance with the present invention, I provide a direct current source of welding current of conventional design appropriate for the process, and between the direct current source and the welding arc circuit I provide polarity reversing means, analogous to a reversing switch, together with means for controlling the program of polarity reversal times, whereby regular alternations of straight polarity and reverse polarity are set up. Control means are provided whereby the cycle of alternation may be divided in any desired proportion, for example, over a range from substantially all straight polarity to substantially all reverse polarity.

A conventional or standard direct current drooping source may be used. Commutation between the two polarity states is effected in decreased change-over time by the use of a resonant commutating circuit that employs coupled air core inductors and a capacitor in the resonant circuit. The reversal switching may be accomplished with thyratrons, silicon controlled rectifiers, or equivalent means. A series resistor is employed in the arc circuit to prevent undue damping of oscillations in the commutating circuit by low shunt impedance in the welding circuit. The onset of the single shot re-ignition voltage is preferably delayed until the end of the commutating interval when the inverter output voltage has reached its maximum. The use of a single-shot re-ignition source confines the re-ignition voltage to a very short time interval, thereby reducing the severity of radio frequency interference caused by arc starting when using high frequency means.

Other features, objects and advantages will appear from the following more detailed description of illustrative embodiments of the invention, which will now be given in conjunction with the accompanying drawings.

In the drawings:

FIGURE 5 is a schematic diagram of an arc re-igniting circuit for the system shown in FIGURE 3, together with delayed gating means for actuating the re-ignition circuit;

FIGURE 6 is a diagram showing how FIGURES 3, 4 and 5 are to be arranged to show an interconnected system;

FIGURE 8 is a schematic diagram showing an arc re-igniting and gating circuit alternative to that shown in FIGURE 5.

Figure 1:
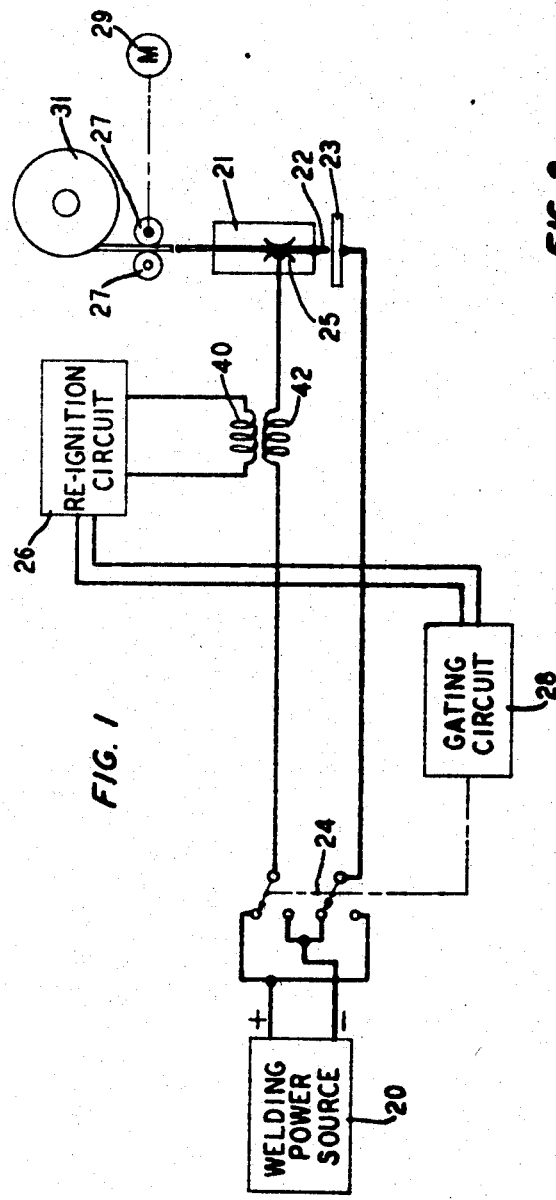
FIGURE 1 is a block diagram, partly schematic, of a generic embodiment of the invention.

Referring to FIGURE 1, there is shown a direct current welding power source 20 connected to an electric arc electrode 22 and workpiece 23 through a mechanical inverter 24 shown as a double pole reversing switch; together with an arc re-ignition circuit 26 connected to the arc circuit through a transformer comprising a primary winding 40 and a secondary winding 42. A gating circuit 28 controls both the mechanical inverter and the re-ignition circuit. It is to be expected that the mechanical inverter will usually be less advantageous than the solid state switching arrangement shown in FIGURE 3. However, the circuit of FIGURE 1 is useful in explaining by analogy the essential operation of the arrangement.

In the operation of the arrangement of FIGURE 1, the gating circuit 28 acts periodically to actuate the reversing switch 24, thereby connecting the electrode 22 to the source 20 alternately in straight polarity and in reverse polarity. Furthermore, the gating circuit 28 periodically triggers a pulse of oscillations from the re-ignition circuit 26 at advantageous times in the cycle to enable the arc to re-ignite, particularly when connected to the source 20 in reverse polarity, that is, with the arc electrode connected to the positive terminal of the source 20. When the arc is connected to the source in straight polarity, that is, with the arc electrode connected to the negative terminal of the source, re-ignition usually takes place without any action of the re-ignition circuit 26 if the electrode 22 is a thermionic material such as tungsten. However, the re-ignition circuit may be used with straight polarity also if a cold cathode material consumable electrode is used. The gating circuit 28 is assumed to be adjustable in such manner that the relative time intervals of straight and reverse polarity may be selected as desired over a wide range of values, for example, from substantially all straight polarity to substantially all reverse polarity.

Figure 2:
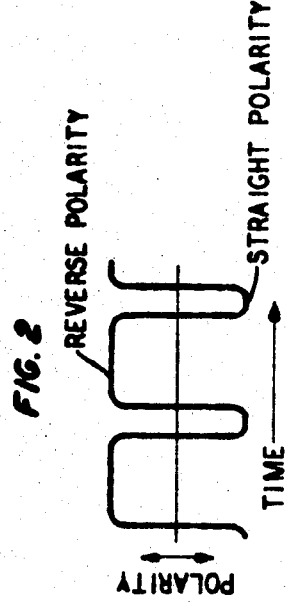
FIGURE 2 is a graph illustrating an exemplary alternation of states of reverse polarity and straight polarity.

FIGURE 2 illustrates a preferred allocation of periods of reverse polarity and straight polarity for use in welding, for example, mild steel using a consumable electrode. More of the total time of a complete cycle is given over to the reverse polarity than to the straight polarity. During the period of reverse polarity, the welding conditions are arranged for optimum transfer of metal from the electrode to the workpiece, the metal being transported due to the force of the arc. During the period of straight polarity, heating of the electrode occurs due to the bombardment of the electrode by positive ions attracted toward the electrode by the negative potential at the electrode. To avoid material deposition of metal upon the workpiece during the period of straight polarity, this period is preferably made shorter, usually considerably shorter than the period of reverse polarity. The optimum operating conditions may be established by suitably adjusting both the frequency of alternation and the relative time of dwell (duty cycle) of the system in the reverse polarity state and in the straight polarity state. In the description of the systems shown in FIGURES 3–8 it is disclosed how both the frequency of alternation and the duty cycle can be adjusted, each substantially independently of the other.

Figure 3:
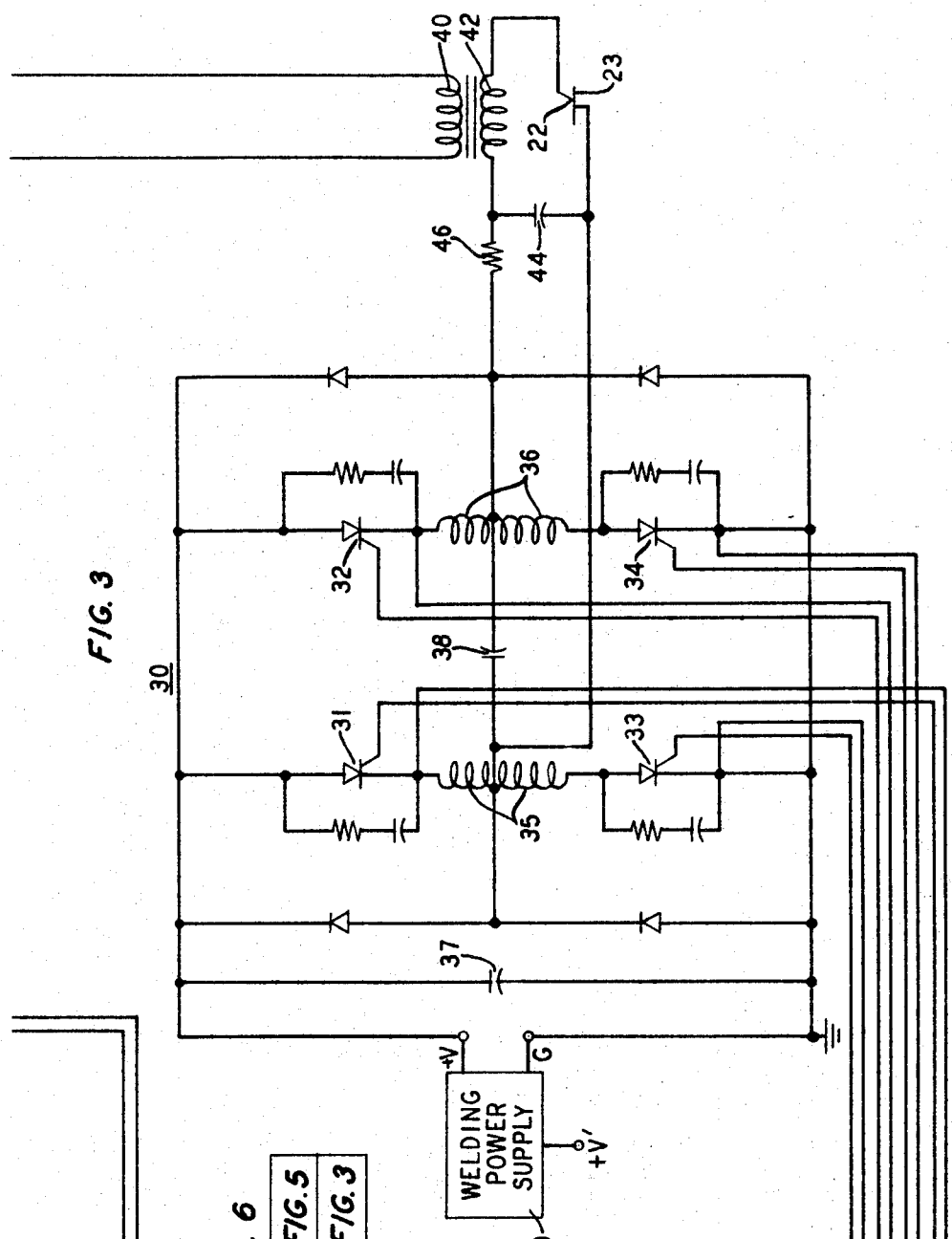
FIGURE 3 is a schematic diagram of a portion of a more specific embodiment of the invention, showing a unidirectional current source connected to an electric arc circuit by way of a solid state inverter circuit.
Figure 4:
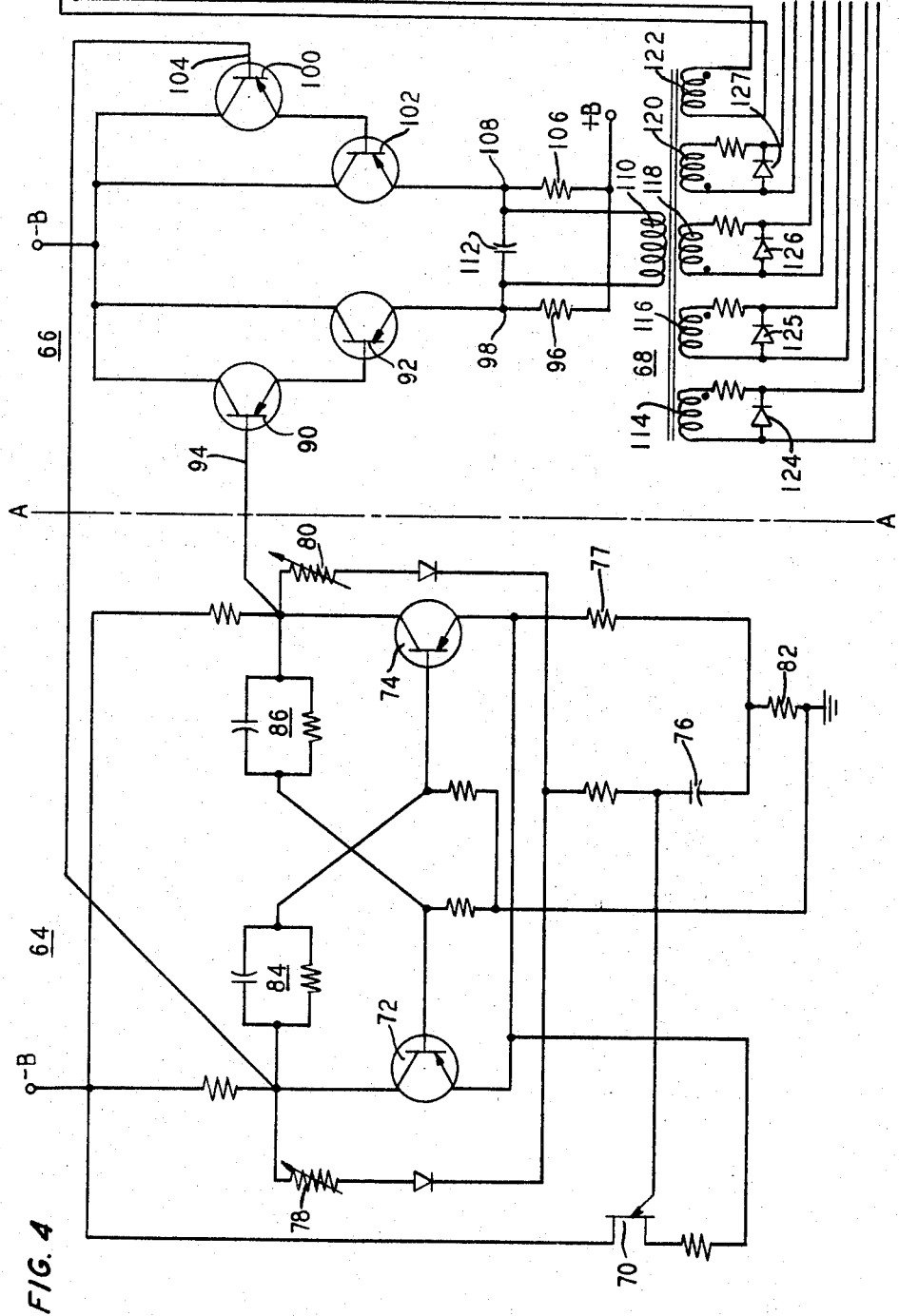
FIGURE 4 is a schematic diagram of a gating circuit for use in conjunction with the system shown in FIGURE 3.

FIGURES 3–5 show an elaboration of the system of FIGURE 1, in which the mechanical reversing switch 24 of FIGURE 1 is replaced by a solid-state inverter 30, and details are shown of an illustrative gating circuit to serve as the timing drive 28, and of an illustrative re-ignition circuit in place of the block 26.

Referring to FIGURE 3, the inverter 30 comprises silicon controlled rectifiers 31, 32, 33, 34 connected in the respective arms of a bridge network. The rectifiers 31 and 33 are connected in series aiding polarity at opposite ends of an auto-transformer 35. The rectifiers 32 and 34 are similarly connected in series aiding polarity at opposite ends of an auto-transformer 36. The series circuit 31, 35, 33 and the series circuit 32, 36, 34 are connected in parallel, the anodes of the rectifiers 31 and 32 being directly joined together, as are also the cathodes of the rectifiers 33 and 34, to form the bridge. The positive terminal +V of the source 20 is connected to the common anode junction of the rectifiers 31 and 32 and the negative terminal G of the source 20 is connected to the common cathode junction of the rectifiers 33 and 34, with a storage capacitor 37 connected directly between the positive and negative terminals of the source 20 to improve commutation by tending to maintain a constant potential even though the source 20 may have a drooping characteristic. The input to the bridge may be considered to be across the capacitor 37. The output from the bridge is taken off from respective intermediate points of the auto-transformers 35 and 36, across which points there is connected a capacitor 38. The output from the bridge is connected by way of the secondary winding 42 to the arc electrode 22 and workpiece 23.

The gating circuit is detailed in FIGURE 4 and controls both the re-ignition timing circuit (FIGURE 5) and the rectifiers 31–34, each of the latter being controlled by a controlling electrode individual thereto, and each said controlling electrode having a separate connection to the gating circuit.

In the operation of the arrangement of FIGURE 3, straight polarity is applied to the arc by applying triggering potential from the gating circuit to rectifiers 31 and 34, thereby rendering rectifiers 31 and 34 highly conductive while leaving rectifiers 32 and 33 substantially open-circuited. The positive terminal of the source 20 is by that means connected to the workpiece 23 through rectifier 31 and the electrode 22 is connected to the negative terminal of the source 20 through rectifier 34. Reverse polarity is applied to the arc by triggering the rectifiers 32 and 33 into the conductive state while leaving the rectifiers 31 and 34 substantially open-circuited. The positive terminal of the source 20 is by that means connected to the arc electrode 22 through the rectifier 32 and the workpiece 23 is connected to the negative terminal of the source 20 through the rectifier 33.

The auto-transformers 35 and 36 each comprise air-cored windings coupled together with substantially unity coupling coefficient to aid in switching from one rectifier to the other with no material time loss while at the same time breaking the current in the rectifier which is to be extinguished. It is well known that when a silicon controlled rectifier has been put into the conductive state by impressing the proper biasing voltage upon its control terminal, the device remains conductive regardless of any subsequent change in the magnitude or in the polarity of the biasing voltage. To render the device non-conductive, it is necessary to remove the driving potential that is producing the current through the device, or at least to reduce the driving potential below a certain threshold value. The rapid switching of the current from one rectifier to the other and the extinguishing of the initially conductive rectifier are accomplished simultaneously as follows. With the rectifiers 31 and 34 in the conductive state, the full current from the supply 20 is flowing through the upper half of the transformer 35, the load, and the lower half of the transformer 36, maintaining magnetic flux in both transformers as well as charging the capacitor 38 to the potential V. It will be assumed that the rectifiers 32 and 33 at this time are non-conductive, so that there is no material current in the lower half of the transformer 35 nor in the upper half of the transformer 36. If now rectifiers 32 and 33 are suddenly made conductive, by application of the proper bias to their control terminals, the potential V of the supply 20 acts in series aiding relationship with the potential V on the capacitor 38 to impress a total potential of 2V upon the series combination of the lower half of transformer 35 and the upper half of transformer 36, inducing a back electromotive force of V in each coil. These back electromotive forces are automatically of the proper polarity to annul the effect of the potential V of the supply 20 upon the rectifiers 31 and 34, rendering the rectifiers 31 and 34 non-conductive. Thereupon, the combined potential of the supply 20 and the charge on the capacitor 38 is effective to overcome the back electromotive force in the transformers 35 and 36 and so rapidly build up the current in the reverse direction through the load by way of the rectifiers 32 and 33. During the period of the current reversal, the magnetic flux does not have to be reversed, since the current in each of the transformers 35 and 36 flows from top to bottom in FIGURE 2, regardless of the direction of the current through the load, the current merely shifting from one half of the transformer to the other half. Consequently, the magnetic flux remains substantially constant at all times. Since the magnetic field is the same before and after the current transfer, no time is lost in flux change and so a rapid transition is facilitated. For further details of the operation of the inverter 30, reference may be made to an article entitled "A Silicon Controlled Rectifier Inverter With Improved Commutation" by W. McMurray and D. P. Shattuck, published in Transactions of A.I.E.E., vol. 80, part 1, pages 531–42 (1961). The invention, however, is not limited to the use of the particular inverter shown and any other suitable type of inverter may be used instead.

FIGURE 4 shows illustrative details of a gating circut 28, comprising a sawtooth wave generating circuit 64, a differential amplifier 66 and a saturable transformer 68.

In the sawtooth wave generating circuit 64 of FIGURE 4, there is shown a unijunction transistor 70, a pair of PNP type transistors 72, 74, a timing capacitor 76, a common timing resistor 77, individual adjustable timing resistors 78, 80 for the transistors 72, 74, respectively, a triggering emitter bias resistor 82, a cross-coupling path 84 between the collector of the transistor 72 and the base of the transistor 74, and a slmilar cross-coupling path 86 between the collector of the transistor 74 and the base of the transistor 72.

In the operation of the circuit 64 of FIGURE 4, it will first be assumed that the transistor 72 is on and the transistor 74 is off, and that the capacitor 76 is charged, positive on the side thereof nearer to ground. The capacitor 76 is then discharging through the resistor 77, the emitter-collector path of the transistor 72, and the resistor 78, the time rate of discharge being adjustable by means of the resistor 78. The capacitor 76 impresses a negative potential upon the emitter electrode of the transistor 70, holding that transistor in the non-conducting state until the capacitor 76 has discharged to such a lesser negative potential as to fire the transistor 70, at which latter time a large current pulse passes through the biasing resistor 82, the capacitor 76 and the transistor 70, recharging the capacitor 76 and sending a pulse of negative bias to the emitters of the transistors 72 and 74.

The negative bias across the resistor 82 turns off transistor 72, placing a −B potential upon the collector electrode of the transistor 72, which potential is transferred by way of the path 84 to the base of the transistor 74, turning that transistor on. The charging of the capacitor 76 almost immediately turns off the transistor 70 whereupon the capacitor 76 again discharges, this time through the resistor 77, the transistor 74, and the resistor 80, under timing control of the resistor 80. This time, when transistor 70 is triggered on, the bias developed in the resistor 82 turns off the transistor 74 which in turn puts the transistor 72 into the conductive state. The overall result is that the collector electrodes of the transistors 72 and 74 alternately rise and fall in potential, the time spent in each of two conditions being adjustable individually by means of the resistors 78 and 80, so that the times spent in the two conditions may be made equal, or they may be made unequal in any desired ratio.

The differential amplifier 66 comprises on one side a train of transistors 90, 92, controllable by means of a voltage from the collector of the transistor 74 impressed upon the base 94 of the first transistor 90 of the train. The transistors are connected between supply voltages +B and −B, with a resistor 96 in series therewith between a junction 98 and the +B terminal. On the other side of the amplifier is shown another train of transistors 100, 102, controllable by means of a voltage from the collector of the transistor 72 impressed upon the base 104 of the transistor 100. The transistors 100, 102 are connected between +B and −B with a series resistor 106 between a junction 108 and +B. The junctions 98 and 108 are connected to opposite ends of the primary winding 110 of the saturable transformer 68, preferably with a capacitor 112 shunted across the terminals of the winding 110. The transistors are shown as being all of the PNP type.

In the operation of the differential amplifier 66, two conditions occur alternately in time succession. In one condition, base 94 is at relatively negative potential while at the same time the base 104 is relatively positive. This renders the transistors 90, 92 conductive and the transistors 100, 102 non-conductive. Accordingly, the junction 98 is rendered close to −B in potential and junction 104 close to +B, so that current flows through the winding 110 from junction 108 to junction 98. In the other condition, the circumstances are reversed and current flows through the winding 110 from junction 98 to junction 108.

The saturable transformer 68 is shown with the primary winding 110 and secondary windings 114, 116, 118, 120, and 122. Each secondary winding is marked with a dot at one end of the winding in accordance with a convention that indicates the relative direction of the winding with respect to the magnetic core. The windings 114 and 116 are shunted by diodes 124 and 125 respectively, the conductive direction of each said diode being from the undotted end to the dotted end of the winding. The windings 118 and 120 are shunted by diodes 126 and 127 respectively, the conductive direction of each said diode being from the dotted end to the undotted end of the winding. The winding 122 has no shunting diode. Each of the windings 114, 116, 118 and 120 is connected by an individual pair of leads across between the control electrode and cathode of the silicon controlled rectifiers 31, 34, 32, and 33.

Referring to the operation of the saturable transformer 68, it will be assumed that the polarities are such that when the current in the primary winding 110 is from right to left, the currents in all the secondary windings will flow in the direction toward the dotted end of the respective winding, and that when the primary current is from left to right, the secondary currents flow away from the dotted ends. It will be evident that when the primary current is from right to left, the secondary currents in the windings 118 and 120 are short-circuited by the respective diodes, so that only the windings 114 and 116 are effective to send current to the control electrodes of the silicon controlled rectifiers. Accordingly, only the rectifiers 31 and 34 are made conductive when the primary current is from right to left, and as noted above, this condition sets up the inverter 30 to supply straight polarity to the arc. Following back through the circuit of FIGURE 4, it will be found that primary current in the saturable transformer flows from right to left when the transistors 90, 92 are on, which in turn occurs when transistor 74 is off and the timing capacitor 76 is discharging through the transistor 72 under the timing control of the adjustable resistor 78. Therefore, in the circuit as set up in FIGURE 4, the resistor 78 controls the time interval during which straight polarity is supplied to the arc and, conversely, the resistor 80 controls the time interval during which reverse polarity is supplied to the arc.

During the period of reverse polarity, the secondary windings 114 and 116 are short circuited by the diodes and only the windings 118 and 120 are effective to send biasing impulses to their respective silicon controlled rectifiers, which latter are 32 and 33.

Due to the saturable feature of the transformer 68, a pulse of primary current generates a corresponding pulse in the secondary circuit only up to such time as the core of the transformer becomes saturated, whereupon the secondary pulse stops. Thus the transformer generates secondary pulses which can be made of uniform duration regardless of the length of the primary pulse provided the core becomes saturated before the end of each primary pulse. By choosing a suitable value of saturation flux for the transformer 68, gating pulses of suitable duration can be obtained which will trigger on the silicon controlled rectifiers while removing the triggering potential well before the time when the rectifier is to be rendered non-conducting, so as not to interfere with the switching operation.

Arc re-ignition is accomplished by setting up a train of a few high frequency oscillations in the arc circuit. The oscillations are generated by means of a sharp pulse impressed upon a resonant circuit through a voltage step-up pulsing transformer 134 which is controlled by a re-ignition synchronizing circuit shown in FIGURE 5. The resonant oscillatory circuit comprises the primary winding 40 (FIGURE 3) together with a capacitor 154 which may be adjustable to select a desired frequency of oscillation. As shown, the oscillatory circuit is coupled by the secondary winding 42 into the arc circuit. In the arc circuit a capacitor 44 is provided as a means of preventing the re-ignition voltage from feeding back into the welding source. A series resistor 46 is employed to prevent undue damping of the commutating circuit by abnormally low impedance in the welding circuit. A second voltage step-up is provided in the transformer 40, 42.

In the arc re-ignition synchronizing circuit of FIGURE 5, a direct current source 130, shown as a battery, is arranged to supply current to a silicon controlled rectifier 132 in series with the primary winding of the transformer 134 and an inductor 136. A full wave rectifier 138 is provided to supply current to a three-stage NPN transistor amplifier comprising transistor 140 in the first stage, transistor 142 in the second stage, and a train of transistors 144, 145 in the third stage. A capacitor 146 connects the emitter of the transistor 145 in the train 144 to the triggering electrode of the silicon controlled rectifier 132. A time delay circuit is provided which comprises a resistor 148 and a capacitor 150 connected to the secondary winding 122 of the saturable transformer 68 (FIGURE 4). The secondary winding of the transformer 134, which is under the control of the silicon controlled rectifier 132 is connected in parallel to a spark gap device 152 and the primary winding 40 (FIGURE 3). Connnected serially with the winding 40 are the capacitor 154 and a rheostat 156.

In the operation of the circuit of FIGURE 5, a pulse from the secondary winding 122 (FIGURE 4) charges the capacitor 150 through the resistor 148 producing a time delay. In the half cycle when capacitor 150 impresses a positive charge upon the base electrode of the transistor 140, that transistor becomes conductive at the end of the delay period when the potential is sufficiently positive. This causes the potential of the collector electrode of the transistor 140 to drop, thereby making transistor 142 non-conductive, and raising the potential of the collector electrode of the transistor 142. This rise in potential is transmitted through a capacitor 143 to the base electrode of the transistor 144, rendering the transistor train conductive and sending a pulse through the capacitor 146 to the triggering electrode of the rectifier 132. The rectifier 132 is thereby rendered conductive, in turn sending a pulse through the primary winding of the transformer 134 and the inductor 136 from the battery 130. The transformer 134 steps up the voltage of this pulse to such a value as to break down the spark gap at 152, causing a train of several high frequency oscillations in the oscillatory circuit comprising the capacitor 154, the primary winding 40 and the rheostat 156, the resistance of which provides the desired amount of damping to confine the oscillations to a desired small number. The train of damped high frequency oscillations is repeated in the secondary winding 42 in the arc circuit and enables the arc to start in known manner.

A switch 158 is shown, having three positions, upper, middle and lower. With the switch in the upper position as shown, the circuits of FIGURE 5 are operable as described above. If desired, the switch may be omitted and a permanent connection substituted therefor. If the switch is included, it can be operated into the middle position if it is desired to cut out the synchronizing function otherwise provided by the system of FIGURE 5. If the switch is placed in the lower position, a single pulse from a battery 160 can be delivered to the control electrode of the rectifier 132 to provide a single shot arc starting train of high frequency oscillations.

Figure 7:
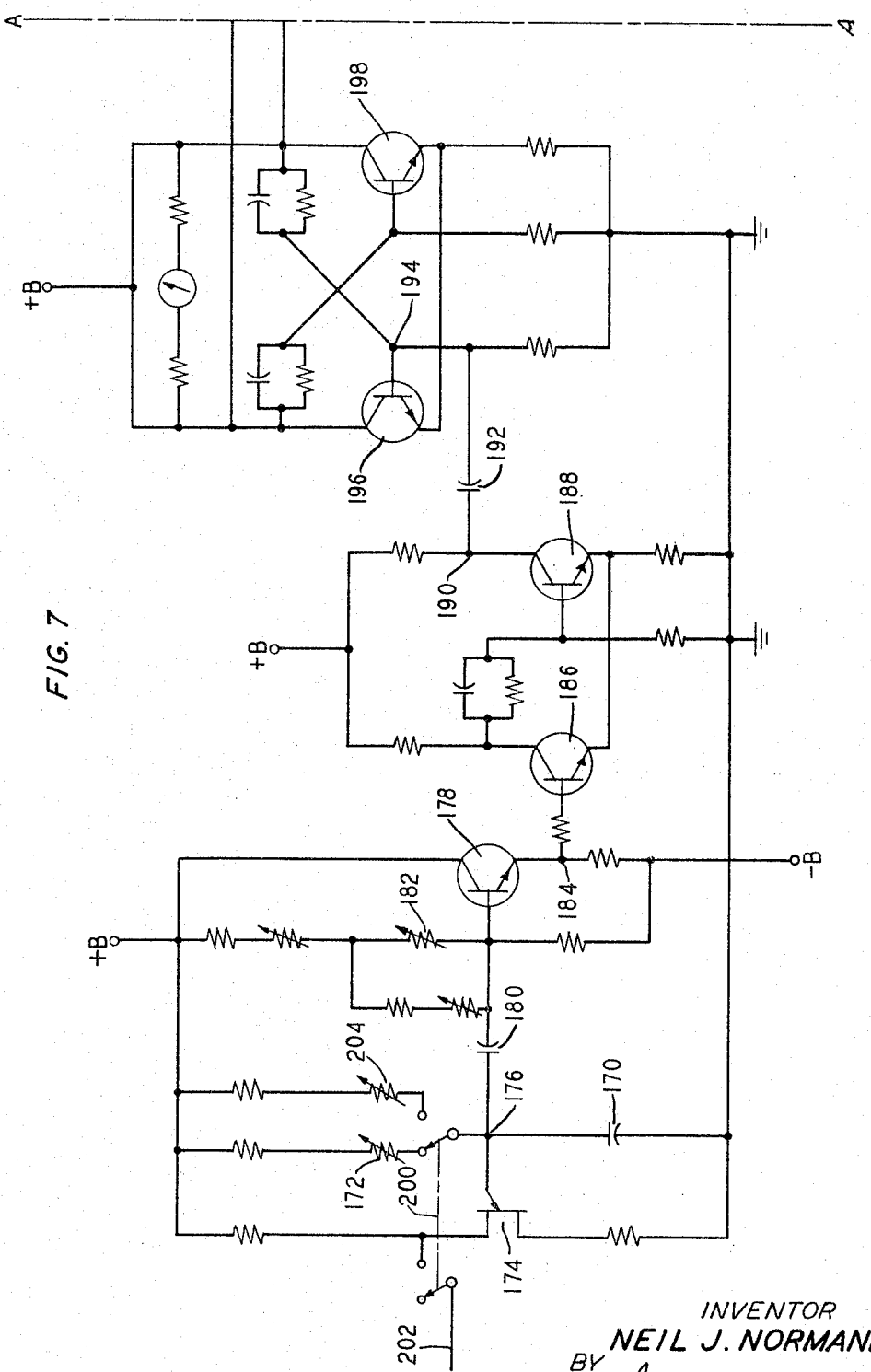
FIGURE 7 is a schematic diagram showing alternate circuits for a portion of a gating system as shown in FIGURE 4, the diagram in FIGURE 7 to be substituted for the portion of FIGURE 4 to the left of the line A—A in FIGURE 4.

FIGURE 7 shows a preliminary portion of a gating circuit alternative to the part of FIGURE 4 to the left of the broken line A—A. FIGURE 7 incorporates means to more effectively separate the frequency adjustment and the duty cycle adjustment of the gating circuit together with means for sharpening the square wave form of the gating wave.

The frequency of gating is determined by regulating the charging rate of a timing capacitor 170 by means of an adjustable resistor 172. A unijunction transistor 174 is connected in shunt with the charging circuit, so that when the charge on the capacitor 170 reaches the threshold potential of the transistor the capacitor is discharged through the transistor and the charging cycle repeats, thereby generating a sawtooth wave at the junction 176 between the capacitor 170 and the resistor 172. The sawtooth wave is combined with an adjustable biasing potential upon the base electrode of a transistor 178 shown as being of NPN type. The junction 176 is capacitively coupled to the base of the transistor 178 by a relatively large capacitor 180. The bias potential for the transistor 178 is supplied by a voltage dividing network of resistors connected between +B and —B, the principal adjustable resistor being shown at 182. The resistor 182 is effective to determine the duty cycle, that is, the division of time between straight and reverse polarities. The transistor 178 serves as an emitter follower generating the desired gating wave at the emitter junction 184.

The gating wave at the junction 184 is impressed upon the base electrode of a transistor 186, which transistor together with a similar transistor 188 forms a Schmitt trigger which generates an amplified replica of the gating wave, but with reversed polarity, providing low potential when the gating wave is high potential and high potential when the gating wave is low potential. This gives a desired phase reversal of the gating wave, the phase-reversed wave appearing at the collector terminal 190 of the transistor 188.

A differentiating capacitor 192 serves to differentiate the wave existing at the junction terminal 190 and to impress the differentiated wave, comprising sharp pulses at each transition point in the gating wave, upon the base electrode 194 of a transistor 196, which transistor together with a similar transistor 198 makes up a flip-flop circuit which produces a replica of the gating wave that is characterized by sharper phase reversals than exist in the original gating wave. The thus sharpened gating wave is impressed upon the differential amplifier 66 of FIGURE 4.

A gang switch 200 is shown which may be used to select either internal synchronization as above described or to substitute synchronizing pulses from an external source or line 202. With the switch in the position shown, the internal synchronization is in effect. If the switch is operated to the other position, the line 202 is connected to the transistor 174 and an alternative timing resistor branch, including an adjustable timing resistor 204 is substituted for the branch including the resistor 172. The use of this switch is optional. Instead, the resistor 172 may be permanently connected to the base terminal 176.

FIGURE 8 shows an alternative to the re-ignition synchronizing circuit of FIGURE 5 whereby arc starting or re-ignition may be provided with straight polarity power supply as well as with reversed polarity, instead of only with reversed polarity as is the case in FIGURE 5.

Two silicon controlled rectifiers 132' and 132" are provided, each separately controlled, in place of the single rectifier 132 of FIGURE 5. One of the rectifiers 132' and 132" is used to initiate arc starting for straight polarity starting and the other for reverse polarity starting. A power potential V' furnished by the power supply 20 is supplied through one or the other of the rectifiers 132' and 132" alternately to the circuit comprising the transformer 134 and the inductor 136 to initiate the arc re-ignition function as described in connection with FIGURE 5.

To control which of the rectifiers 132' and 132" is triggered on, the control pulse from winding 122 (FIGURE 4) is impressed upon the base electrodes of a pair of opposed transistors 210 and 212 which are supplied with a potential V" from the full-wave rectifier 130. Each of the transistors 210 and 212 functions as an emitter follower, but in opposite phases, so that when transistor 210 is on, transistor 212 is off, and vice versa. The emitter electrodes of both these transistors are connected to the base electrode of a transistor 214 which is one of a train of transistors forming a preamplifier for the input to the transistor 142 of FIGURE 5. As in the system of FIGURE 5, the transistor train 142, 144, 145 generates a triggering pulse for a silicon controlled rectifier. In FIGURE 8, two triggering pulses are made available, in separate circuit branches, one for rectifier 132' and the other for rectifier 132". The transistors 216, 218 and 220 shown in FIGURE 8 form intermediate amplifier stages between the transistors 214 and 142. The transistor 210 has a connection from its emitter electrode to the base electrode of a transistor 222 and the transistor 212 has a connection from its emitter electrode to the base electrode of a transistor 224. When transistor 210 is on, it turns on transistor 222 which sends a triggering pulse to the control electrode of the silicon controlled rectifier 132'. On the other hand, when transistor 212 is on, it turns on transistor 224 which sends a triggering pulse to the control electrode of the silicon controlled rectifier 132".

An adjustable time delay is introduced into the circuit of transistors 220 and 142, which transistors together form a Schmitt trigger. The delay time is determined by the charging rate of a timing capacitor 226 connected to the base electrode of the transistor 220 and controlled as to charging rate by an adjustable resistor 228 in the collector-emitter circuit of the transistor 218. As shown, the capacitor 226 is charged from the potential V" through the resistor 228 and the transistor 218.

Synchronized arc re-ignition may be provided for either reversed polarity, straight polarity, or both. FIGURE 8 shows how a versatile arrangement may be provided in which synchronized re-ignition is available for both polarities. A switch 229 is shown by the closing of which the gating pulse for triggering re-ignition with straight polarity is shorted out, thus providing a choice between re-ignition on reversed polarity only, or on both polarities.

It is to be understood that the invention is not to be limited to use with visible or open arcs but is also applicable, for example, to processes wherein the welding is carried on in the presence of a coating, flux, or slag environment.

While illustrative forms of apparatus and methods in accordance with the invention have been described and shown herein, it will be understood that numerous changes may be made without departing from the general principles and scope of the invention.

I claim:

1. In an electric arc working method in which a metal working arc is established between a consumable metal electrode and the work and in which the characteristic arc operation is dissimilar on straight and reverse polarity the improvement which comprises alternately applying reverse polarity and straight polarity to energize the metal working arc, dwelling proportionately longer on reverse polarity than straight polarity to obtain maximum advantage of the metal transfer characteristic of the reverse polarity while still obtaining increased burn-off of the electrode due to the straight polarity portion of the cycle, and alternating the polarity at a frequency to avoid any disadvantage associated with prolonged operation on any given polarity.

2. A method of arc welding using a consumable electrode, said method comprising the steps of alternately applying reverse polarity and straight polarity to energize the welding arc, dwelling the system proportionately longer in the reverse polarity state than in the straight polarity state, the system being adjusted for material metal transfer from the electrode to the workpiece while in the reverse polarity state, the dwell time in the straight polarity state being sufficiently short to prevent material metal deposition in said state, and the frequency of alternation of said states being adjusted to secure optimum deposition of metal.

3. A system for metal arc welding comprising a consumable electrode, a source of essentially direct current power supply for said system, means to connect said source to the said electrode and to the workpiece in reverse polarity and in straight polarity alternately and repetitively, means to adjust the frequency of alternation of said reverse polarity and straight polarity connections, means to cause the said system to dwell proportionately longer in the reverse polarity connection than in the straight polarity connection, whereby metal transfer from the electrode to the workpiece is substantially prevented in said straight polarity connection, and means to effect spray transfer of metal during periods of said reverse polarity connection.

4. An apparatus for supplying to an electric arc straight polarity direct current and reverse polarity direct current alternately, in combination, a source of unidirectional current, a solid state inverter circuit connected between said source and the arc, flip-flop circuit means, means to determine the dwell times of said flip-flop circuit in each of two states, a saturable transformer, means controlled by said flip-flop circuit to actuate said transformer to produce control pulses to actuate said inverter circuit, arc re-ignition means connected to the arc, and means actuated by said saturable transformer for energizing said re-ignition means at predetermined time intervals, whereby direct current from said source is supplied to the arc alternately in straight polarity and in reverse polarity substantially in synchronism with the changes in state of said flip-flop circuit.

5. An apparatus for supplying to an electric arc straight polarity direct current and reverse polarity direct current alternately, in combination, a source of unidirectional current, a solid state inverter circuit connected between said source and the arc, flip-flop circuit means, means to determine the dwell times of said flip-flop circuit in each of two states, a saturable transformer, means controlled by said flip-flop circuit to actuate said transformer to produce control pulses to actuate said inverter circuit, arc re-ignition means connected to the arc, and means actuated by said saturable transformer for energizing said re-ignition means at predetermined time intervals, timing means for delaying the energization of the arc re-ignition means for a predetermined time interval after receipt of a control pulse from said saturable transformer, whereby direct current from said source is supplied to the arc alternately in straight polarity and in reverse polarity substantially in synchronism with the changes in state of said flip-flop circuit.

References Cited

UNITED STATES PATENTS

| | | | |
|---|---|---|---|
| 3,330,933 | 7/1967 | Maklary | 219—131 |
| 2,697,160 | 12/1954 | Williams | 219—135 |
| 3,068,352 | 12/1962 | Correy | 219—137 |
| 3,071,680 | 1/1963 | Anderson et al. | 219—131 |

RICHARD M. WOOD, *Primary Examiner.*